United States Patent [19]

Soga

[11] Patent Number: 5,721,840
[45] Date of Patent: Feb. 24, 1998

[54] INFORMATION PROCESSING APPARATUS INCORPORATING AUTOMATIC SCSI ID GENERATION

[75] Inventor: Takumi Soga, Sagamihara, Japan

[73] Assignee: Olympus Optical Co., Ltd., Tokyo, Japan

[21] Appl. No.: 732,663

[22] Filed: Oct. 16, 1996

Related U.S. Application Data

[63] Continuation of Ser. No. 306,415, Sep. 15, 1994, abandoned.

[30] Foreign Application Priority Data

Sep. 20, 1993 [JP] Japan ................. 5-233684

[51] Int. Cl.⁶ ................................................. G06F 13/00
[52] U.S. Cl. ................................... 395/309; 395/882
[58] Field of Search ................................. 345/882, 309

[56] References Cited

U.S. PATENT DOCUMENTS

| | | | |
|---|---|---|---|
| 4,942,579 | 7/1990 | Goodlander et al. | 371/51 |
| 5,175,822 | 12/1992 | Dixon et al. | 395/275 |
| 5,257,367 | 10/1993 | Goodlander et al. | 395/600 |
| 5,345,565 | 9/1994 | Jibbe et al. | 395/325 |
| 5,369,751 | 11/1994 | Kambayashi et al. | 395/894 |
| 5,398,325 | 3/1995 | Chang et al. | 395/403 |
| 5,459,867 | 10/1995 | Adams et al. | 395/700 |
| 5,515,515 | 5/1996 | Kennedy et al. | 395/283 |

OTHER PUBLICATIONS

Datamation, Issue No. 129,533, Apr. 1977, 23:51–54, *Honeywell's new 66/85. It's fast. It's powerful. And it'hungry.*

*Primary Examiner*—Jack B. Harvey
*Assistant Examiner*—David A. Wiley
*Attorney, Agent, or Firm*—Armstrong, Westerman, Hattori, McLeland & Naughton

[57] ABSTRACT

An information processing apparatus includes an interface for connecting a host computer and a plurality of external units, and a cache memory unit interposed in the interface, for temporally storing data which is transmitted or received through the interface. The cache memory unit includes an access control circuit for selectively setting a plurality of ID numbers corresponding to ID numbers of the plurality of external units in the interface, receiving access to the plurality of external units by the host computer, and making it possible that the host computer transparently accesses the plurality of external units.

8 Claims, 8 Drawing Sheets

1

INFORMATION PROCESSING APPARATUS INCORPORATING AUTOMATIC SCSI ID GENERATION

This application is a continuation application Ser. No. 08/306,415 filed Sep. 15, 1994, now abandoned.

BACKGROUND OF THE INVENTION

1. Field of the Invention

The present invention relates to an information processing apparatus in which a host computer is connected to a plurality of external units such as disk drive units via interface.

2. Related art Statement

Recently, the processing speed of a computer is rapidly increased. With this increase, the processing speed of an external unit such as an external storage unit to be connected to the computer is also required to be increased.

FIG. 1 shows the configuration of the first example of information processing apparatus in which a host computer is connected to a plurality of Small Computer System Interface (SCSI) disk drive units via a SCSI bus, as an example of an information processing apparatus in which a host computer is connected to external units via interface.

In the first example, the host computer 51 and SCSI disk drive units 52a, 52b and 52c are provided with SCSI interface (IF) circuits 53 and 54, respectively, and the host computer 51 is connected to each of the SCSI disk drive units 52a, 52b and 52c by a SCSI bus 55 via the SCSI interface circuits 53 and 54. It should be noted that each of the SCSI disk drive units 52a, 52b and 52c is arranged to have a drive unit 56 and a storage medium 57.

In the information processing apparatus thus arranged, in a case where the host computer 51 accesses the SCSI disk drive units 52a, 52b and 52c for recording and reproduction of information, the host computer 51 first selects one of the SCSI disk drive units based on an SCSI sequence and then the transfer of commands and data is performed between the host computer and the selected SCSI disk drive unit.

Now, the operations will be described below in a case of reading out data from the selected SCSI disk drive unit 52 (one selected from among the units 52a, 52b and 52c) and in a case of writing data into the SCSI disk drive unit 52.

In the case of data read, the SCSI disk drive unit 52 transfers data to the host computer 51 after or during reading out the data from the storage medium 57.

In the case of data write, the SCSI disk drive unit 52 writes data into the storage medium after or during receiving the data from the host computer 51.

In this manner, the SCSI disk drive unit 52 performs the data read or data write while it make the drive unit 56 to operate to access the storage medium 57 and exchanges data with the host computer 51.

Accordingly, the host computer 51 is waited until the SCSI disk drive unit 52 completes the access to the storage medium and as the result of this the processing speed of the whole apparatus becomes slow dependent upon that of the SCSI disk drive unit.

Since an external storage unit such as the disk drive unit typically requires a relatively long time for moving a head to a destination location for access to the storage medium, the processing speed thereof is slow. As one of the ways to speed up the processing of such a disk drive unit, there is employed a cache memory operable at a high speed which is connected between the host computer and disk drive unit and in which data is temporally stored to perform the high speed data transfer.

As the cache memory, there is used a storage device operable at faster processing speed than that of the disk drive unit. For instance, there is used a semiconductor storage device in a case where the disk drive unit uses a magnetic storage medium as in a hard disk unit and a hard disk unit or semiconductor storage device in a case where the disk drive unit uses an optical storage medium as in an optical disk unit.

FIG. 2 is a block diagram showing an apparatus in which the cache memory is provided in the SCSI disk drive unit, as the second example of the information processing apparatus in which the host computer and the external unit are connected to each other via the SCSI bus.

In the second example, the cache memory 60 is provided between the SCSI interface circuit 54 and the drive unit 56 connected to the storage medium 57 for each of the SCSI disk drive units 59a, 59b and 59c, in addition to the configuration of the first example shown in FIG. 1.

The operation of data write and data read in the second example will be described below.

In the data read, the SCSI disk drive unit 59 checks to see if there is in the cache memory 60 data requested by the host computer 51. When there is not the requested data in the cache memory 60, the SCSI drive unit 59 reads out the requested data from the storage medium 57 to transfer the data to the host computer 51. On the other hand, when there is the requested data in the cache memory 60, the SCSI disk drive unit 59 transfers the requested data stored in the cache memory 60 to the host computer 51.

Accordingly, when there is the requested data in the cache memory, it is not necessary to read out the requested data from the storage medium and it is necessary only to access the high speed cache memory, so that the processing of the disk drive can be completed for a short time, resulting in decreasing the time for which the host computer is waited.

In the data write, the SCSI disk drive unit 59 receives data from the host computer 51 to writes in the cache memory 60 once. The SCSI disk drive unit 59 informs the completion of write processing to the host computer 51 at the time when the reception of data is completed. Then, the SCSI disk drive unit 59 writes the data stored in the cache memory 60 into the storage medium 57.

Accordingly, since the processing of the host computer can be completed at the time when the SCSI disk drive unit receives data and writes it in the high speed cache memory, the host computer needs not to be waited until the access to the storage medium by the SCSI disk drive unit is completed.

As described above, by incorporating the cache memory in the disk drive unit, the waiting time of the host computer can be reduced and there can be increased the processing speed of the whole apparatus in which the disk drive unit is connected to the host computer via an interface such as the SCSI interface.

In order to speed up the processing of an old disk drive unit already owned by a user, however, the old disk drive unit needs to be replaced by a new disk drive unit in which a cache memory is built for achievement of the arrangement of disk drive unit in which a cache memory is provided. In this case, nevertheless only the cache memory is to be added the whole disk drive unit must be newly purchased, so that there is caused a problem that much money for excessive replacing cost is required for the high speed processing.

FIG. 3 is a block diagram showing an apparatus in which the cache memory unit is provided between the host computer and the SCSI disk drive unit, as the third example of the information processing apparatus in which the host computer and the external unit are connected to each other via the SCSI bus.

In the third example, in addition to the arrangement of the first example shown in FIG. 1, the SCSI disk drive units 52a, 52b and 52c are connected to the cache memory units 61a, 61b and 61c and connected to the host computer 51 by the SCSI bus 55 via the cache memory devices 61a, 61b and 61c, respectively. Each of pairs of the SCSI disk drive unit and cache memory unit 52a and 61a; 52b and 61b; and 52c and 61c is accommodated in a single case as shown in the figure by a dashed line. As a result, the pair can be accessed apparently as one SCSI drive unit by the host computer 51.

The cache memory unit 61, which represents one of the units 61a, 61b and 61c, has two SCSI interface (IF) circuits, an SCSI interface circuit a 62 is connected to the host computer 51 via the SCSI bus 55 and an SCSI interface circuit b 63 is connected to the SCSI disk drive unit 52 via an internal bus 64. A cache memory 60 is connected between the SCSI interface circuits a and b In the third example, the cache memory is not arranged to be incorporated in the SCSI disk drive unit itself but the cache memory unit is connected between the host computer and the SCSI disk drive unit, unlike the second example shown in FIG. 2. By providing the cache memory in the cache memory unit, the same effect as in the second example can be obtained.

In this case, if the apparatus is viewed from the side of the host computer 51, the SCSI interface circuit a 62 of the cache memory unit 61 would be viewed as if it is the SCSI disk drive unit and each of the SCSI interface circuits a 62 is assigned with one SCSI-ID. In the example shown in FIG. 3 the SCSI interface circuit 53 of the host computer 51 is assigned with ID=7, and the SCSI interface circuits a 62 of the cache memory unit 61 are assigned with IDs=2, 3 and 4, respectively. It is not always necessary that the SCSI-ID coincides with the SCSI-ID of the SCSI disk drive unit 52. However, by assigning each of the SCSI interface circuits a 62 with the SCSI-ID, a set of the cache memory unit and the SCSI disk drive unit could be accessed as one SCSI unit from the host computer 51.

However, only one SCSI-ID can be set to one SCSI interface circuit in the SCSI bus. Since one interface circuit can be set with only one ID in the unit thus connected via the interface, it is necessary that a plurality of cache memory units assigned with different IDs are connected as shown in FIG. 3 in a case where a cache memory is provided between the host computer and the disk drive unit in order to speed up the processing of a plurality of disk drive units. Therefore, there is caused a problem that the configuration of the apparatus becomes complicated and the provision of a plurality of cache memories invites the cost up of the whole apparatus.

OBJECTS AND SUMMARY OF THE INVENTION

An object of the present invention is to provide an information processing apparatus in which a host computer can be connected to a plurality of external units through one cache memory means.

Another object of the present invention is to provide an information processing apparatus in which the processing time of a plurality of external units can be reduced by one cache memory means without complicating and with inexpensive configuration, so that the processing speed of the whole apparatus can be increased.

An information processing apparatus according to the present invention includes:

interface means for connecting a host computer and a plurality of external units; and cache memory means interposed in said interface means, for temporally storing data which is transmitted or received through said interface means, and wherein said cache memory means comprises access control means for selectively setting a plurality of ID numbers corresponding to ID numbers of said plurality of external units in said interface means, receiving access to said plurality of external units by said host computer, and causing said host computer to transparently access said plurality of external units.

The other features and advantages of the present invention would be appreciate from the following description.

BRIEF DESCRIPTION OF THE DRAWINGS

FIG. 4 is a block diagram showing an information processing apparatus in which the host computer is connected to a plurality of SCSI disk drive units via the SCSI bus;

FIG. 5 is a flow chart indicating a procedure in a case where the host computer accesses one SCSI disk drive unit;

FIG. 6 is timing charts indicating the operation until one SCSI unit selects another SCSI unit;

FIG. 7 is a block diagram showing a cache memory unit; and

FIG. 8 is a flow chart indicating the operation when the cache memory unit shown in FIG. 7 is selected by the host computer.

DETAILED DESCRIPTION OF THE PREFERRED EMBODIMENTS

An embodiment of the present invention is shown in FIGS. 4 to 8.

Figure 1:
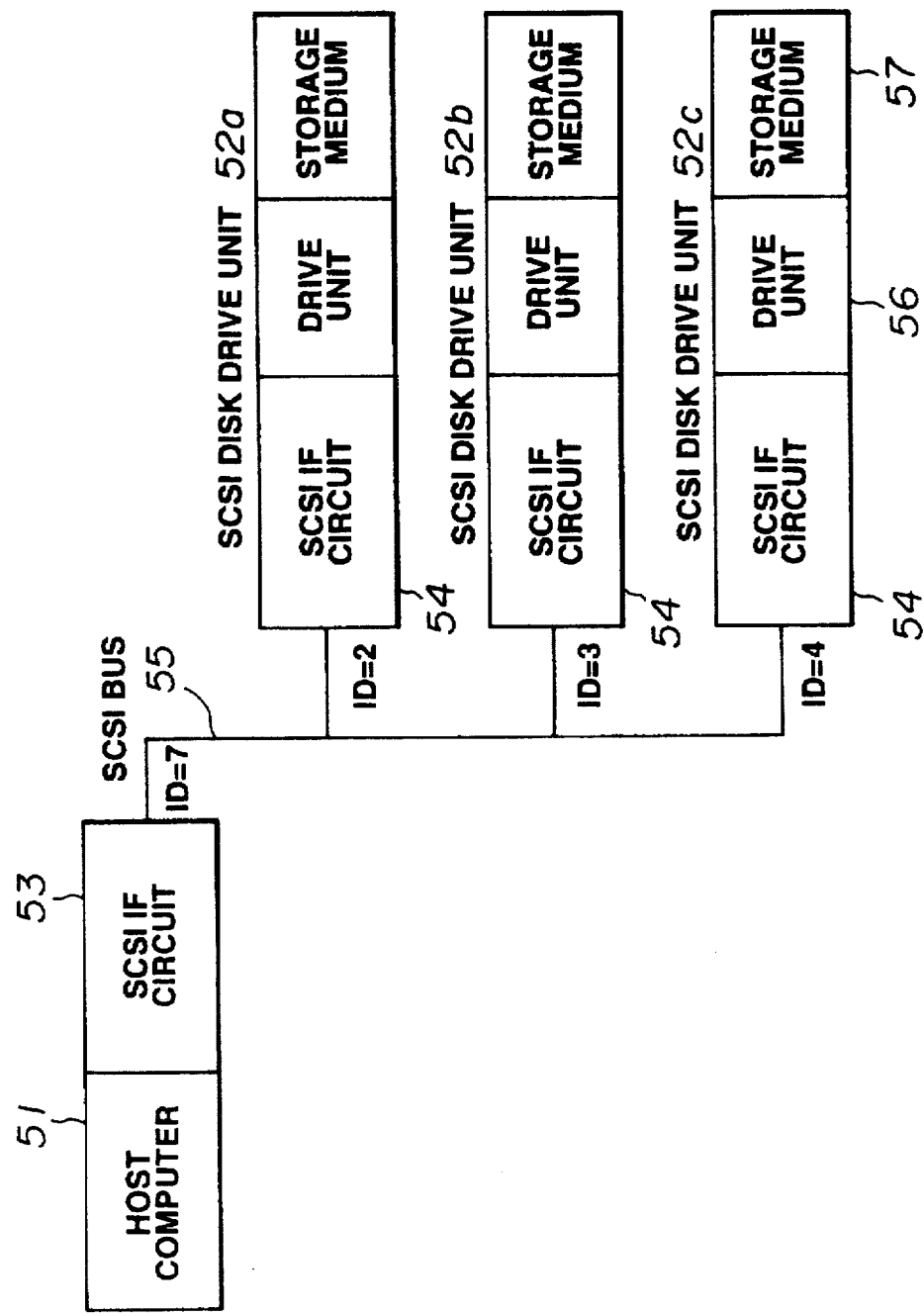
FIG. 1 is a block diagram showing the first example of an information processing apparatus in which a host computer is connected to a plurality of SCSI disk drive units via a SCSI bus, as an example of an information processing apparatus in which the host computer is connected to external units via an interface.
Figure 2:
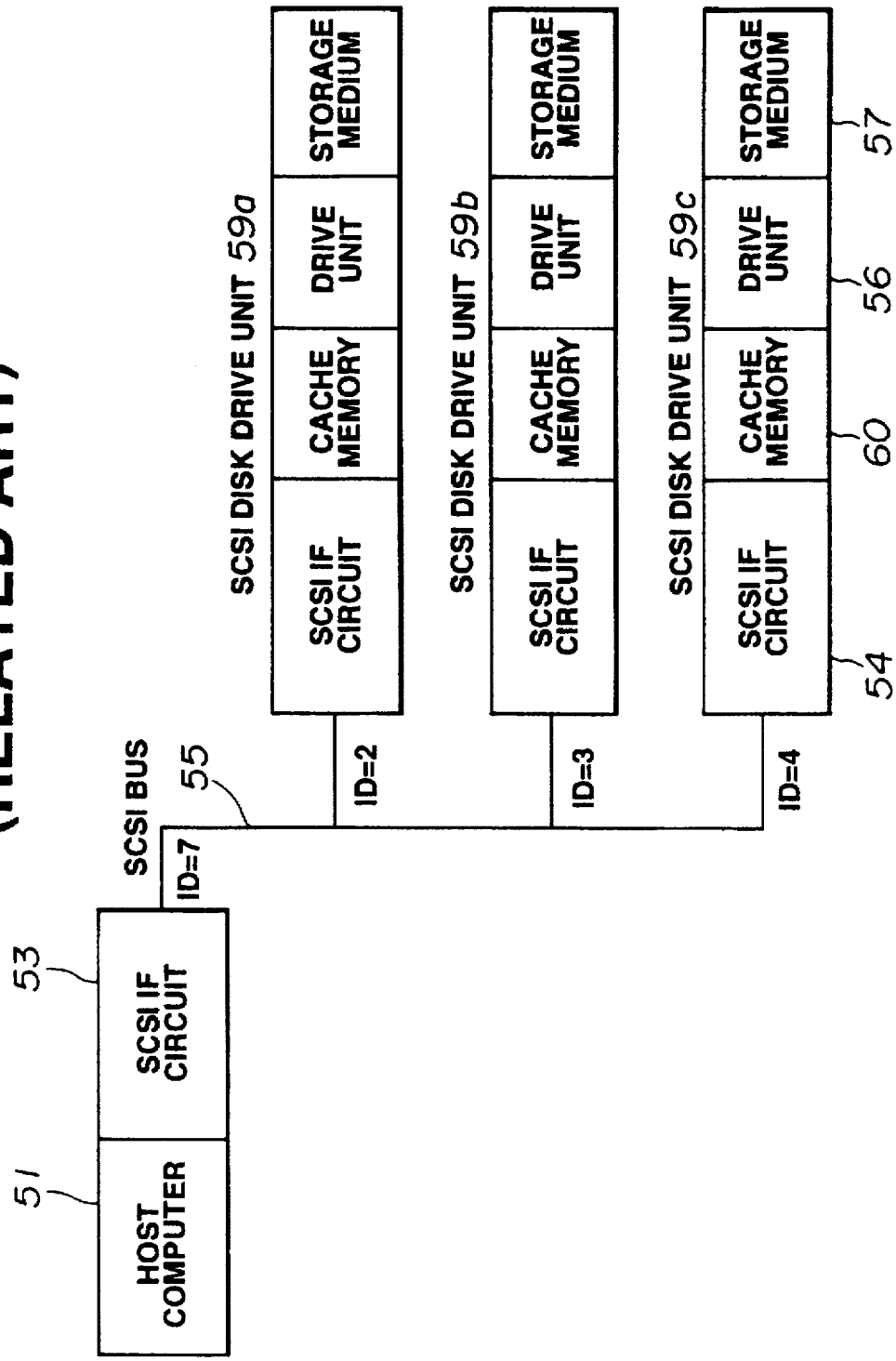
FIG. 2 is a block diagram showing an information processing apparatus in which a cache memory is provided in the SCSI disk drive unit, as the second example of the information processing apparatus in which the host computer is connected to the external unit via the SCSI bus.
Figure 3:
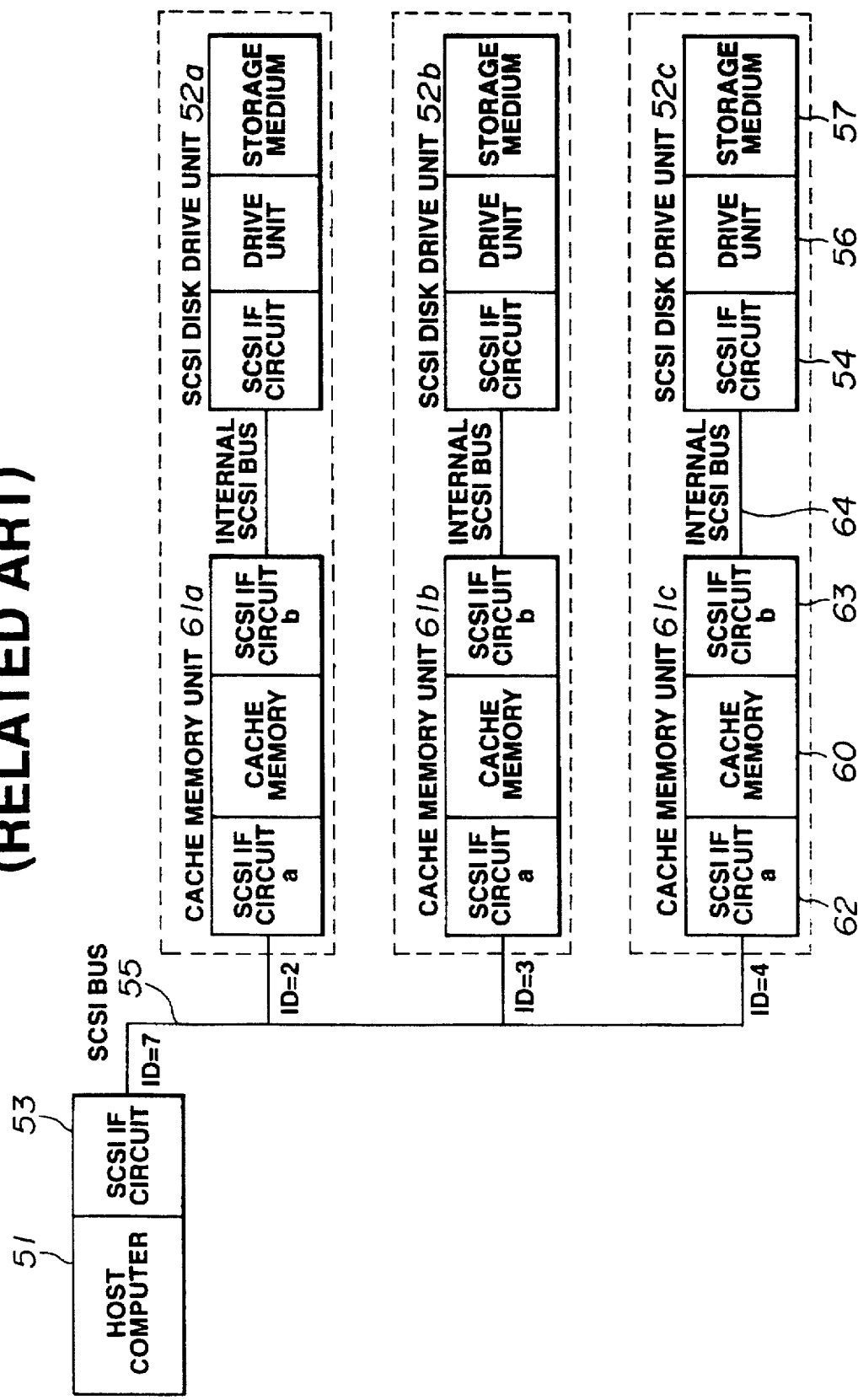
FIG. 3 is a block diagram showing an information processing apparatus in which a cache memory unit is provided between the host computer and the SCSI disk drive unit, as the third example of the information processing apparatus in which the host computer is connected to the external units via the SCSI bus.
Figure 4:
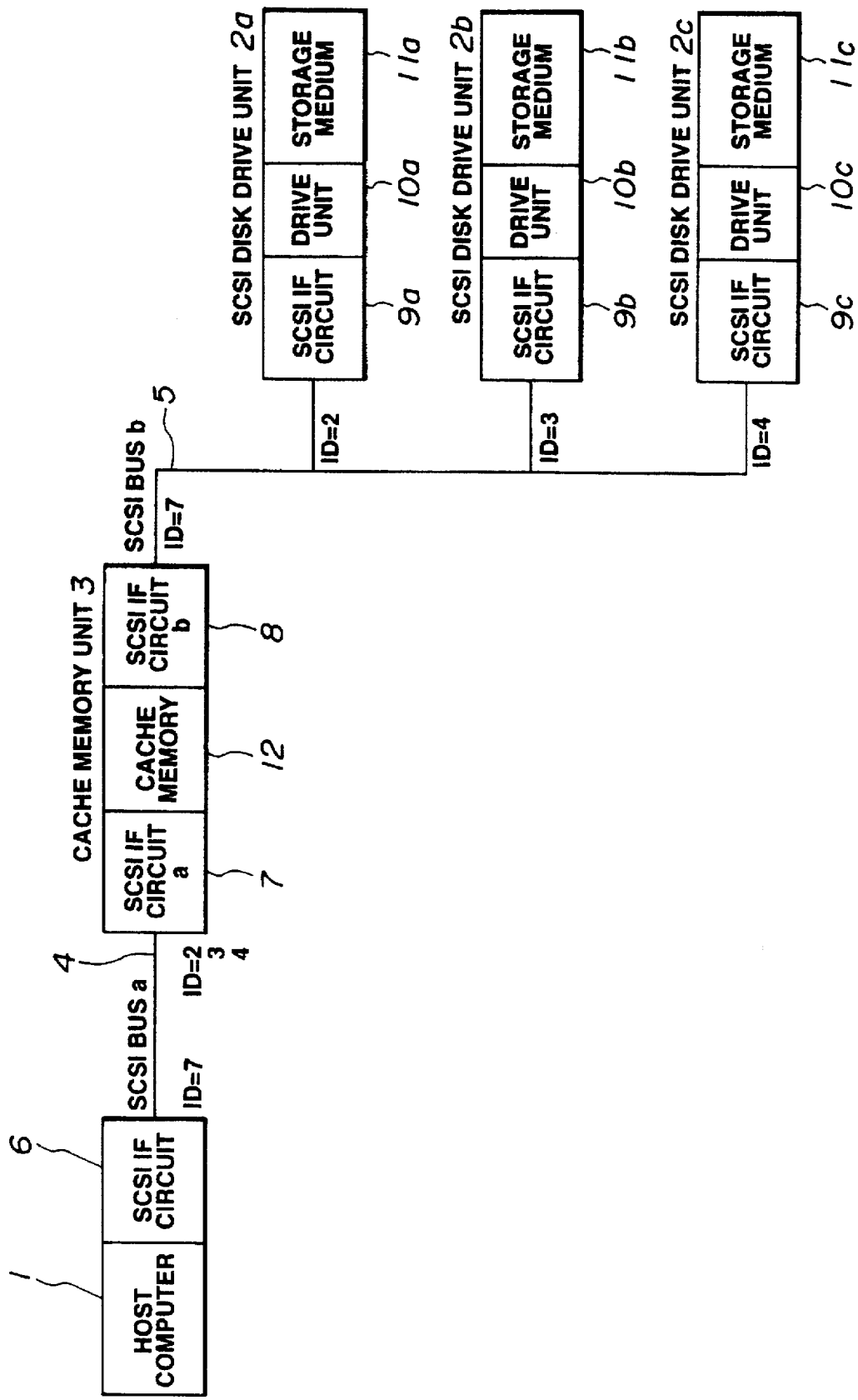
FIGS. 4 to 8 are concerned with an embodiment of the present invention.

FIG. 4 shows, as an example of an information processing apparatus in which a host computer and external units are connected to each other via interface, an information processing apparatus in which the host computer is connected to a plurality of external storage units via a Small Computer System Interface (SCSI) bus using an SCSI as an interface means. Here, an SCSI disk drive unit is used as the external storage unit. As the SCSI disk drive unit there are a hard disk unit using a magnetic storage medium as a storage medium, an optical disk unit using an optical storage unit as the storage medium, or an optoelectromagnetic disk unit. It should be noted that there may be used a recording/ reproducing unit such as an optical card unit using a storage medium which is not a disk medium, other than the SCSI disk drive unit as the external storage unit.

A cache memory unit 3 is provided between the host computer 1 and a plurality of SCSI disk drive units 2a, 2b and 2c as cache memory means having a cache memory for temporally storing data. The cache memory unit 3 is connected to the host computer 1 via an SCSI bus a 4 and to the SCSI disk drive units 2a, 2b and 2c via an SCSI bus b 5.

The cache memory unit 3 includes two SCSI interface (IF) circuits as an interface input and output circuit. One of the two circuits, SCSI interface circuit a 7 is connected to an SCSI interface circuit 6 provided in the host computer 1 via the SCSI bus a 4. On the other hand, the other of the two circuits, SCSI interface circuit b 8 is connected to SCSI interface circuits 9a, 9b and 9c respectively provided in the SCSI disk drive units 2a, 2b and 2c via the SCSI bus b 5. The SCSI disk drive units 2a, 2b and 2c include drive units and storage media 10a and 11a; 10b and 11b; and 10c and 11c, respectively. Each of the storage medium 11a, 11b and 11c is a hard disk as a magnetic storage medium when the corresponding one of the SCSI disk drive units 2a, 2b and 2c is a hard disk unit and an optical disk or optoelecromagnetic disk as an optical storage medium when the corresponding SCSI disk drive unit is an optical disk unit or optoelectromagnetic unit.

Figure 5:
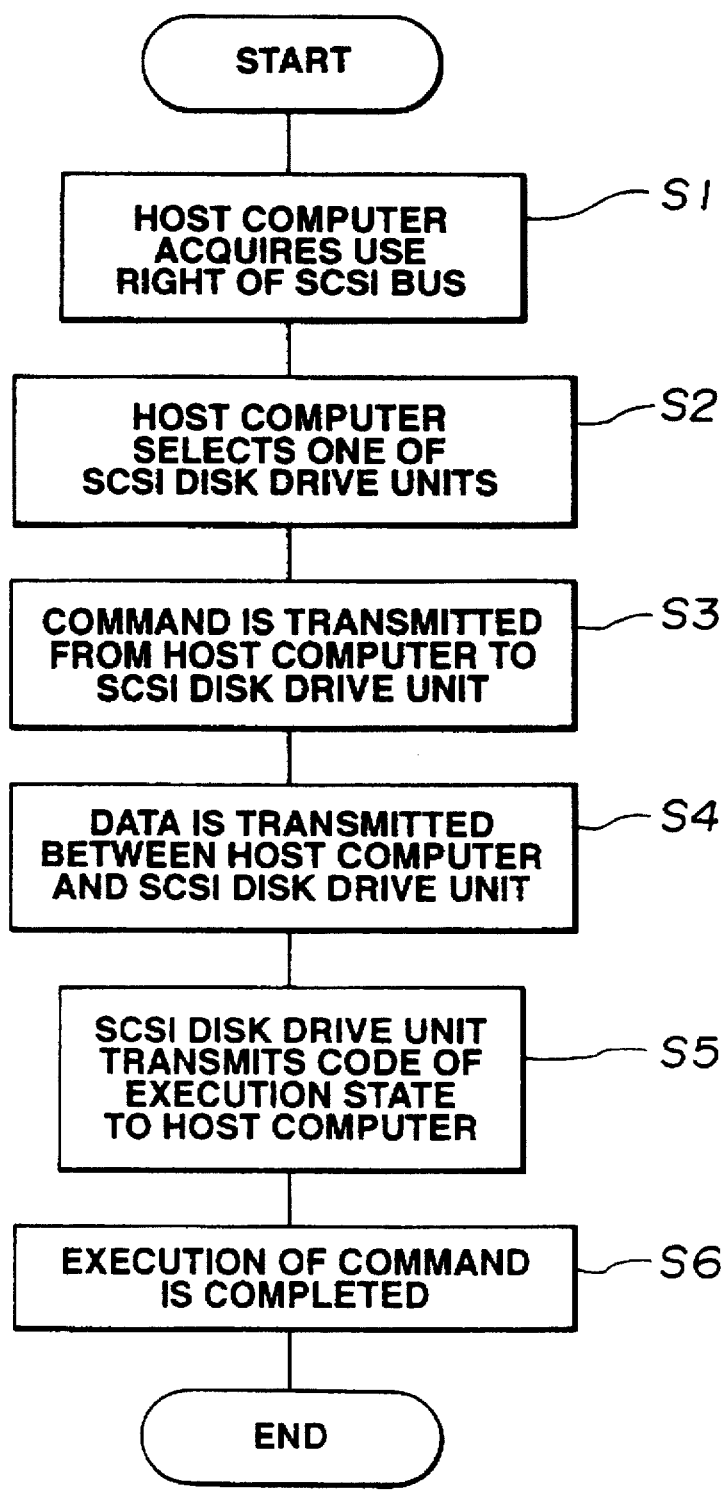

Now, prior to the description of the operation of the embodiment, the basic procedure when the host computer accesses the SCSI disk drive unit via the SCSI bus will be described with reference to the flow chart shown in FIG. 5.

First, in a step S1 (hereinafter, to be referred to simply as S1, abbreviating "step"), the host computer acquires a use right of the SCSI bus. Next, in S2, the host computer selects one to be accessed from among the SCSI disk drive units. In an SCSI system, a unique SCSI-ID (ID number) is assigned to each of the host computer and SCSI disk drive units and the host computer selects a target one from among the SCSI disk drive units using the SCSI-ID in access to the target SCSI disk drive unit.

Each of the SCSI disk drive units connected to the SCSI bus responds only when the SCSI-ID assigned to itself coincides with that used by the host computer for the selection, and changes to a state in which it can receive a command from the host computer. It is referred to as "the selection" hereinafter that the SCSI disk drive unit is selected by the host computer and changes to the command receivable state.

After one SCSI disk drive unit is subject to the selection, a command is transmitted from the host computer to the SCSI disk drive unit in S3 and data transfer is performed between the host computer and the SCSI disk drive unit in S4. In this case, the SCSI disk drive unit transmits to the host computer in S5 an execution state code indicating whether or not the command is normally executed and the host computer receives the execution state code to end the execution of command in S6.

In the configuration of the embodiment shown in FIG. 4, as the SCSI-ID the host computer is assigned with ID=7 and the SCSI disk drive units 2a, 2b and 2c are assigned with ID=2, 3, 4, respectively. In addition, the cache memory unit 3 is provided between the host computer and the SCSI disk drive units. The cache memory unit 3 stores the SCSI-IDs (IDs=2, 3 and 4) of all the SCSI disk drive units 2a, 2b and 2c connected to the SCSI bus b 5 in the initialization.

On the other hand, the host computer 1 designates one from among 2, 3 and 4 as the SCSI-ID to select the SCSI disk drive unit 2 (one of the units 2a, 2b and 2c). Although the host computer 1 would recognize that it directly selects the SCSI disk drive unit 2, it is physically the cache memory unit 3 that is directly connected to the host computer 1 via the SCSI bus a 4 and the cache memory unit 3 is subject to the selection even if the SCSI-ID is any one of 2, 3 and 4 to receive the command from the host computer 1 in place of the SCSI disk drive unit 2 and to exchange data with the host computer 1.

Also, the cache memory unit 3 receives the command from the host computer 1, if necessary, to select and access the SCSI disk drive unit 2 connected thereto via the SCSI bus b 5.

That is, the cache memory unit 3 is subject to the selection by the host computer 1 via the SCSI bus a 4 for the SCSI disk drive unit 2 assigned with any one of the SCSI-IDs to receive the command from the host computer 1 and to exchange data with the host computer 1 in place of the SCSI disk drive unit 2. In addition, the cache memory unit 3 selects and accesses the SCSI disk drive unit 2 having the SCSI-ID, if necessary. In this manner, the host computer 1 can transparently access the SCSI disk drive unit 2 through the cache memory unit 3.

Next, the operation until one of the SCSI units connected to the SCSI bus selects another will be described with reference to the timing charts shown in FIG. 6. In this case, the SCSI unit selecting the other SCSI unit is referred to as "an initiator" and the selected SCSI unit is referred to as "a target". This selection operation is performed in the same manner in either of the SCSI bus a 4 or the SCSI bus b 5.

Figure 6:
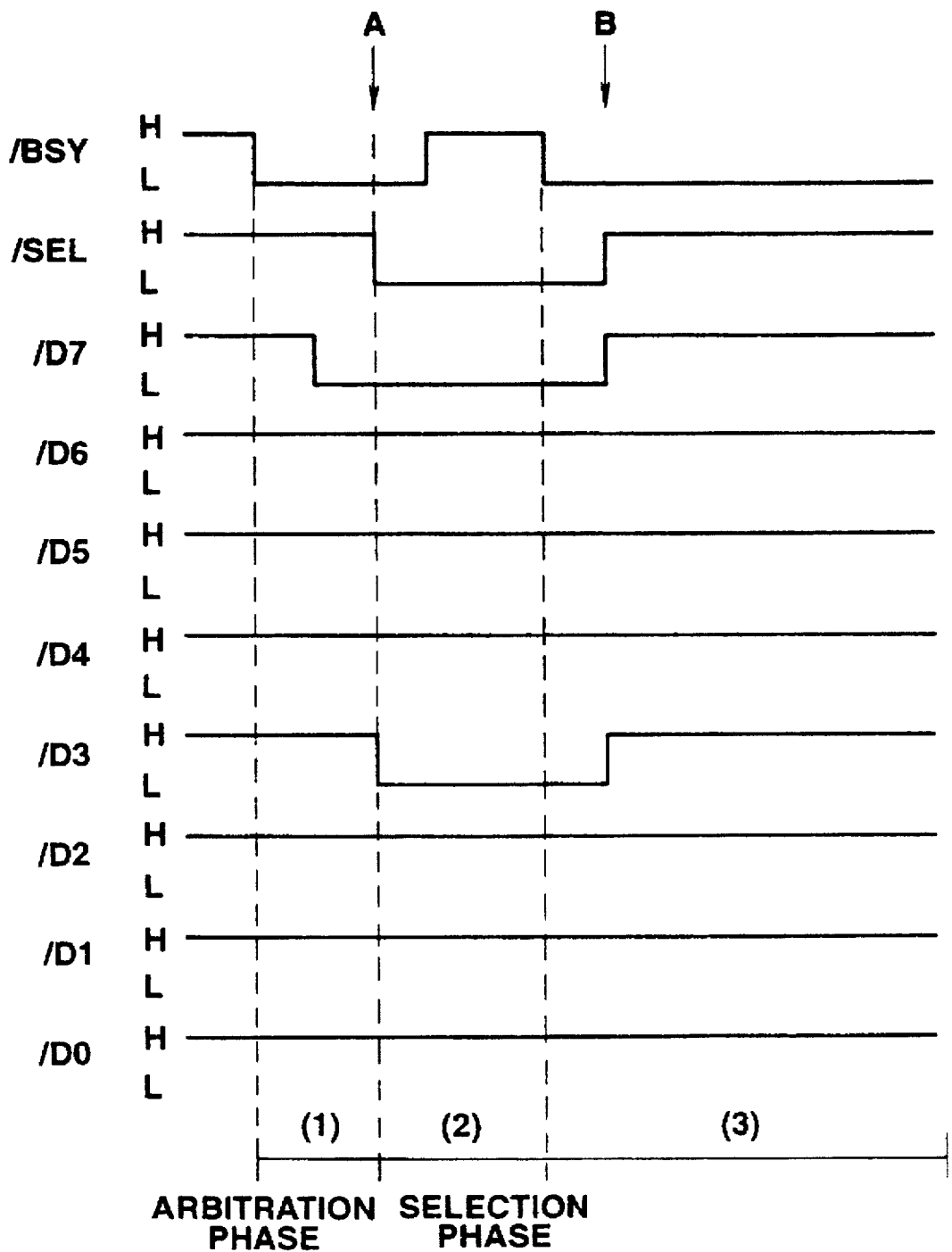

The operation when the initiator selects the target is mainly divided into three phases, as shown in the lower portion of FIG. 6, that is, (i) an arbitration phase, (2) a selection phase, and (3) an information transfer phase for transmission and reception of command or data after the selection. Signals are shown in FIG. 6 in a case where the initiator having the SCSI-ID of "7" selects the target having the SCSI-ID of "3" It should be noted that "/" in each of the signals represents a negative logic in which the signal of a low (L) level (the logic is true) is active.

In the arbitration phase (1), the initiator requests the use right of the SCSI bus to intend to acquire it. The initiator sets the BSY signal to be true and sets the SCSI data bus line (D7) having the same number as its SCSI-ID to be true. When a plurality of units request the use right of the SCSI bus at a time, the unit having the greatest SCSI-ID can acquire the use right of the SCSI bus. Therefore, in the embodiment, the initiator has the SCSI-ID of "7". That is, in FIG. 4, with the SCSI bus a 4, the host computer 1 as the initiator has the SCSI-ID of "7",and with the SCSI bus b 5, the cache memory unit 3 has the SCSI-ID of "7" as the initiator. When the initiator acquires the use right of the SCSI bus, the operation moves to the selection phase.

In the selection phase (2), the initiator which has acquired the use right of the SCSI bus designates the SCSI-ID of the target. The initiator sets the SEL signal to be true, sets the SCSI data bus line (D0 to D6) having the same number as that of the unit to be connected to be true, and resets the BSY signal to be false. In the example shown in FIG. 6, in order to select the target having the SCSI-ID of "3", the SCSI data bus line D3 is set to be true. On the other hand, the SCSI unit as the target having the designated SCSI-ID sets the BSY signal to be true to respond to the connection request from the initiator, resulting in having been subject to the selection.

Then, the operation moves to the information transfer phase (3). The initiator resets the SEL signal to be false so that the selection of the target is completed. Thereafter, the operation moves to another phase such as a message in/out phase, a command phase, and a data in/out phase to perform the transmission and reception of data and commands between the initiator and the target. The description of subsequent operation on the SCSI bus will be omitted. It should be noted that the time difference in the switching of each signal in FIG. 6 is defined based on the SCSI standard.

Figure 7:
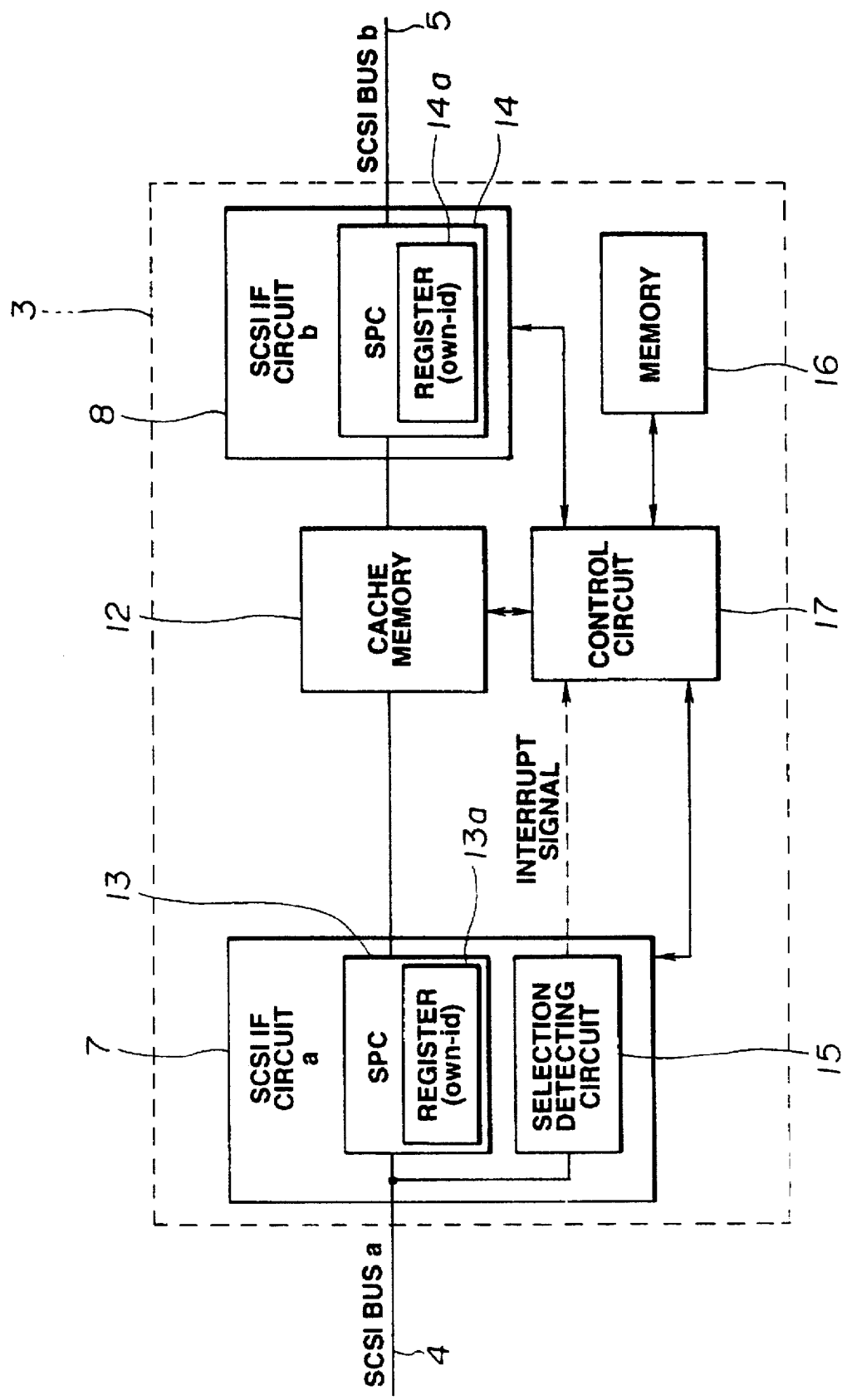

FIG. 7 shows a configuration of the cache memory unit according to the embodiment. The cache memory unit 3 includes a SCSI interface circuit a 7 and a SCSI interface circuit b 8 between which a cache memory 12 is connected. As a cache memory there is used a device operable at a faster processing speed than the disk drive unit, for instance, a semiconductor storage unit when the disk drive unit uses a magnetic storage medium as in a hard disk unit, or a hard disk unit or semiconductor storage unit when the disk drive unit uses an optical storage medium as in an optical disk unit.

Each of the SCSI interface circuits a 7 and b 8 is provided with an SCSI protocol controller (to be referred to as "SPC" hereinafter) 13 or 14 to perform a sequence control on the SCSI bus. Also, the SPC 13 or 14 includes a register (own-id) 13a or 14a for designating the SCSI-ID of it own unit.

The SCSI interface circuit a 7 is designed to be include a selection detecting circuit 15 for detecting the selection phase together with the SPC 13. In addition, a memory 16 is provided in the cache memory unit 3 and the SCSI-IDs of all the SCSI disk drive units 2a, 2b and 2c which are connected to the SCSI bus b 5 are stored in a predetermined area of the memory 16. A control circuit 17 is provided to control the SCSI interface circuits a 7 and b 8 and the cache memory 12 and exchanges signals with each section of the cache memory unit 3. Access control means is constituted of the control circuit 17 and the SCSI interface circuits a 7 and b 8.

Next, the operation of the cache memory unit 3 will be described below.

The cache memory unit 3 stores in the memory 16 via the SCSI interface circuit b 8 the SCSI-IDs of all the SCSI disk drive units which are connected to the SCSI bus b 5, in the initialization such as the power on. In this case, on the SCSI bus b 5, the cache memory unit 3 is the initiator and the SCSI disk drive units 2a, 2b and 2c are the targets. The control circuit 17 performs the selection for the SCSI disk drive unit 2a, 2b and 2c through the SCSI interface circuit b 8 while sequentially changing the SCSI-ID and checks to see which of the SCSI disk drive units 2a, 2b and 2c is to be connected to it based on whether each of them is subject to the selection. In the configuration shown in FIG. 4, "2", "3" and "4" are stored in the memory 16 as the SCSI-IDs.

The SCSI interface circuit a 7 performs the sequence control with the host computer 1 using the SPC 13. The selection detecting circuit 15 in the SCSI interface circuit a 7 outputs an interrupt signal to the control circuit 17 for interruptation when the SEL signal becomes true and informs to the control circuit 17 that the operation is in the selection phase.

The register (own-id) provided in each of the SPCs 13 and 14 takes a value written by the control circuit 17 as the SCSI-ID of its own unit typically in only the initialization.

Each of the SPCs 13 and 14 sets the BSY signal to be true for being subject to the selection only for the selection phase of the SCSI-ID stored in the register (own-id) as shown in (2) of FIG. 6. That is, the SPCs 13 and 14 can be subject to the selection only for the selection phase of one SCSI-ID to be set the BSY signal to be true.

In the embodiment, "7" is written in the register 14a of the SPC 14 by the control circuit 17 and, on the other hand, any one of "2", "3" and "4", for instance, is written in the register 13a of the SPC 13 in the initialization and then either one of "2", "3" and "4" is rewritten in the register 13a. That is, the register 14a of the SPC 14 in the SCSI interface circuit b 8 is set with "7" which is the same SCSI-ID as that of the host computer 1 while the register 13a of the SPC 13 in the SCSI interface circuit a 7 can be rewritten as shown by the flow chart of FIG. 8 and can be subject to the selection for either one of "2", "3" and "4".

Figure 8:
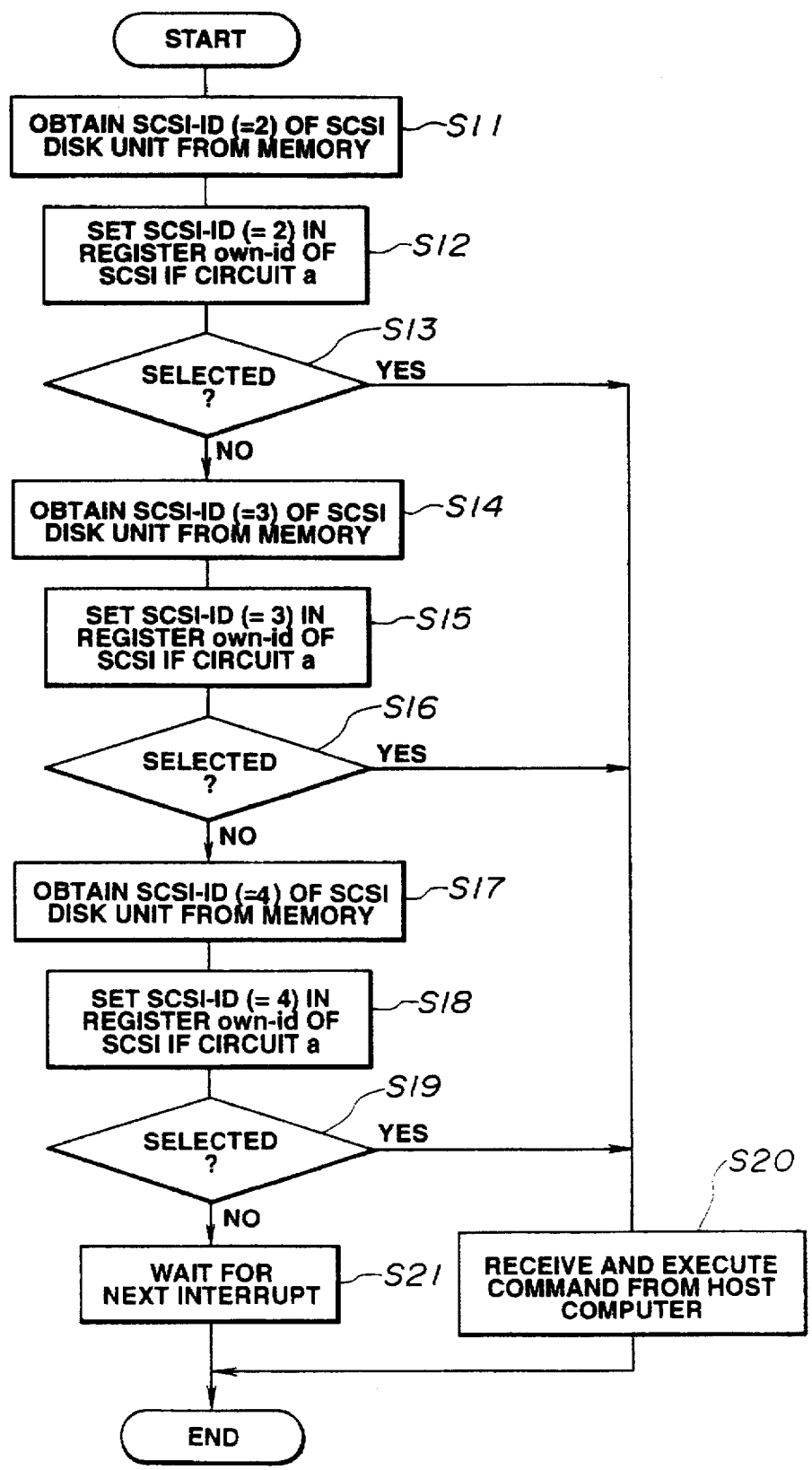

FIG. 8 is a flow chart indicating the operation of the control circuit 17 after the selection phase is informed from the selection detecting circuit 15 by interrupt. The interrupt signal is outputted from the selection detecting circuit 15 to the control circuit 17 when the SEL signal is true on the SCSI bus a 4, i.e., at the timing A in FIG. 6.

The control circuit 17 sequentially writes in the register (own-id) 13a the SCSI-IDs of the SCSI disk drive units stored in the memory 16. The SPC 13 can be subject to the selection to set the BSY signal to be true when the SCSI-ID selected by the host computer 1 coincides with that written in the register (own-id) of the SPC 13 in the SCSI interface circuit a 7.

That is, the control circuit 17 first obtains "2" from the memory 16 as the SCSI-ID of the SCSI disk drive unit connected thereto in S11, sets "2" in the register 13a of the SPC 13 in the SCSI interface circuit a 7 in S12 to determine the SCSI-ID of the SCSI interface circuit a 7 to be "2", and checks in S13 to see whether or not the SCSI-ID of "2" is selected. When the selection is determined to be not performed, the control circuit 17 sets "3" as the SCSI-ID in the register 13a of the SPC 13 in the SCSI interface circuit a 7 to check whether or not the SCSI-ID of "3" is selected, in S14 to S16, as described above. Further, when the selection is determined in S16 to be not performed, the control circuit 17 sets "4" as the SCSI-ID in the register 13a of the SPC 13 in the SCSI interface circuit a 7 to check whether or not the SCSI-ID of "4" is selected, in S17 to S19.

After the selection is performed, the cache memory unit 3 acts in the same manner as the SCSI disk drive unit 2 (one of the units 2a, 2b and 2c). Therefore, the host computer 1 could view as if the SCSI disk drive unit 2 is subject to the selection. The control circuit 17 can determine which of the SCSI disk drive units the host computer 1 has selected, based on the value set in the register (own-id) 13a of the SPC 13 in the SCSI interface circuit a 7 at the time when the selection is performed.

When in either of S13, S16 or S19, the SCSI-ID selected by the host computer 1 coincides with that of the register (own-id) 13a of the SPC 13 to be subject to the selection, the operation goes to S20 to receive and execute a command from the host computer 1. On the contrary, when the any one of the SCSI-IDs of "2", "3" and "4" is not selected, the operation goes to S21 to wait for the next interrupt.

In S20, the operation is branched as follows based on whether the command received from the host computer 1 is a data read command or a data write command.

In a case that the command received from the host computer 1 is the data write command, the cache memory unit 3 receives data from the host computer 1 and the data is written into the cache memory unit 3. The cache memory unit 3 informs to the host computer 1 the completion of the data write processing at the time when the reception of the data is completed. Then, the cache memory unit 3 accesses the SCSI disk drive unit 2 having the SCSI-ID which is subject to the selection via the SCSI bus b 5 in place of the host computer 1 and the data temporally stored in the cache memory 12 is written into the storage medium 11.

Each of the SCSI interface circuits 9a, 9b and 9c of the SCSI disk drive units 2a, 2b and 2c sets the BSY signal to be true for being subject to the selection only when the SCSI-ID selected by the cache memory unit 3 coincides with that of the SCSI interface circuit 9 and the selection is completed at the timing of B shown in FIG. 6.

In this case, the host computer needs not to wait for the completion of the data write into the storage medium by the SCSI disk drive unit and when observed from the host computer, it would be considered that the processing speed of the SCSI disk drive unit is increased. Therefore, the host computer 1 can immediately execute the next processing, resulting in increasing the processing speed of the whole apparatus. It should be noted that the transmission or reception of commands or data between the host computer 1 and the cache memory unit 3 on the SCSI bus a 4 may be independently performed that of command or data between the cache memory unit 3 and the SCSI disk drive unit 2 on the SCSI bus b 5.

In a case of that the command from the host computer 1 is of data read, the cache memory unit 3 checks to see whether or not there is in the cache memory 12 data requested by the host computer 1. When the requested data is determined to be in the cache memory 12, the cache memory unit 3 transmits the requested data stored in the cache memory 12 to the host computer 1 without accessing the SCSI disk drive unit 2, to complete the processing. In this case, the processing time of the whole apparatus can be reduced by the time that is required to access the SCSI disk drive unit.

On the other hand, when the requested data is determined to be not in the cache memory 12, the cache memory unit 3 accesses the SCSI disk drive unit 2 having the SCSI-ID which is subject to the selection via the SCSI bus b 5 in place of the host computer 1 to receive the requested data from the storage medium 11 and transmits the received data to the host computer 1.

In this manner, according to the embodiment, since one SCSI interface circuit of the cache memory unit can be subject to the selection for a plurality of SCSI-IDs, the host computer can be connected to a plurality of SCSI disk drive units through the single cache memory unit. Therefore, only by interposing the single cache memory unit according to the present invention between the SCSIs via which the host computer and an external unit such as a disk drive unit are connected or other interfaces, the data access time can be reduced between the host computer and a plurality of external units with inexpensive configuration without changing the software and setting of the host computer and external units and without the complicated apparatus configuration. Thus, the processing time of the plurality of external units connected via the interface can be reduced so that the processing efficiency can be easily increased, resulting in increasing the processing speed of the whole apparatus.

It should be noted that although the SCSI interface is taken up as an example for the interface means, the present invention is not limited to it and may be applied to another similar type of device interface. Further, the external unit connected to the host computer is not limited to the external storage unit and the same configuration as in the embodiment can be applied to any type of unit if the unit requires a long processing time and the processing speed of the whole apparatus can be increased using the cache memory unit.

It would be apparent that various modifications from many wide aspects can be achieved in the present invention without departing away from the spirit and scope of the present invention. The present invention is not limited to the above specific embodiment but only the description of accompanying claims.

What is claimed is:

1. An information processing apparatus comprising:
   interface means comprising a plurality of SCSI type interface circuits for connecting a host computer and a plurality of external disk drive units; and
   one cache memory means interposed in said interface means, for temporarily storing data which is transmitted or received through said interface means, and wherein said one cache memory means comprises access control means for selectively setting a plurality of ID numbers corresponding to ID numbers of said plurality of external disk drive units in said interface means, receiving access to said plurality of external disk drive units by said host computer, and causing said host computer to transparently access said plurality of external disk drive units, said access control means selectively setting said plurality of ID numbers by automatically succeeding ID numbers of said plurality of external disk drive units connected to said information processing apparatus when said apparatus is activated,
   wherein said one cache memory means is connected via said interface means in series between said host computer and a parallel arrangement of said plurality of external disk drive units, to transparently allow said host computer to access said plurality of external disk drive units.

2. An information processing apparatus according to claim 1, wherein said plurality of external disk drive units includes an external storage unit of type in which information is recorded in a storage medium.

3. An information processing apparatus according to claim 1, wherein said interface means includes a device interface as a Small computer System Interface (SCSI).

4. An information processing apparatus according to claim 1, wherein said cache memory means comprises:
   a first interface input/output circuit connected to said host computer; and
   a second interface input/output circuit connected to said plurality of external disk drive units,
   wherein each of said first and second interface input/output circuits includes a register in which the ID numbers in said interface means are set.

5. An information processing apparatus according to claim 4, wherein said cache memory means causes said access control means to selectively set each of the ID numbers of said plurality of external disk drive units in said interface means into said first interface input/output circuit and is accessed in place of a target one of said external disk drive units corresponding to an ID number of the target one of said external disk drive units selected by said host computer when said host computer accesses said plurality of external disk drive units.

6. An information processing apparatus according to claim 5, wherein said cache memory means causes said first interface input/output circuit to sequentially rewrite the ID numbers of said plurality of external disk drive units in said interface means, and is accessed in place of the target one of said external disk drive units when the ID number in said first interface input/output circuit coincides with that of the target one of said external disk drive units selected by said host computer.

7. An information processing apparatus according to claim 4, wherein said cache memory means causes said access control means to set the same ID number as that of said host computer in said interface means in said second interface input/output circuit, and access the target one of said external disk drive units having the ID number selected by said host computer as required.

8. An information processing apparatus according to claim 1, wherein said cache memory means receives data from said host computer in place of the target one of said external disk drive units when the data is transmitted from said host computer to said plurality of external disk drive units, informs the completion of processing execution to said host computer at the lime when the data is stored, and transmits the data temporally stored to the target one of said external disk drive units in place of said host computer.

* * * * *